US012692814B2

(12) United States Patent
Akcayoz et al.

(10) Patent No.: US 12,692,814 B2
(45) Date of Patent: Jul. 28, 2026

(54) SYSTEMS AND METHODS FOR CONTROLLING STRUT POSITIONS FOR AN AIRCRAFT PROPULSION SYSTEM STRUT ASSEMBLY

(71) Applicant: Pratt & Whitney Canada Corp., Longueuil (CA)

(72) Inventors: Eray Akcayoz, Cote-Saint-Luc (CA); Raja Ramamurthy, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/986,594

(22) Filed: Nov. 14, 2022

(65) Prior Publication Data

US 2024/0159185 A1 May 16, 2024

(51) Int. Cl.
*F02C 7/057* (2006.01)
*B64D 27/10* (2006.01)
*F01D 25/24* (2006.01)

(52) U.S. Cl.
CPC .............. *F02C 7/057* (2013.01); *B64D 27/10* (2013.01); *F01D 25/24* (2013.01)

(58) Field of Classification Search
CPC .......... F02C 7/057; B64D 27/10; F01D 25/24
See application file for complete search history.

(56) References Cited

U.S. PATENT DOCUMENTS 3,442,493 A * 5/1969 Smith, Jr. ............. F04D 29/563
415/164
4,172,361 A * 10/1979 Kronogard .............. F01D 5/141
415/161

5,311,736 A * 5/1994 Lardellier ............... F02K 3/075
60/226.3
6,792,758 B2 * 9/2004 Dowman ................ F01D 25/30
60/725
8,657,561 B2 * 2/2014 Buffone ................ F04D 29/324
415/12
9,062,559 B2 * 6/2015 Little ...................... F01D 5/146
(Continued)

FOREIGN PATENT DOCUMENTS

CN 107725482 A 2/2018
CN 105715574 B 3/2019

OTHER PUBLICATIONS

EP Search Report for EP Patent Application No. 23209895.4 dated Apr. 5, 2024.

*Primary Examiner* — J. T. Newton
(74) *Attorney, Agent, or Firm* — Getz Balich LLC

(57) ABSTRACT

A strut assembly for an aircraft propulsion system includes an outer case, an inner case, a plurality of struts, and a plurality of pressure sensors. Each strut extends between and to the outer case and the inner case. A first strut of the plurality of struts includes a leading strut portion and a trailing strut portion. One or both of the leading strut portion and the trailing strut portion is rotatable. The leading strut portion extends between a first axial end and a second axial end. The first axial end forms a leading edge of the first strut. The leading strut portion includes a first side surface and a second side surface. The plurality of pressure sensors includes a first pressure sensor and a second pressure sensor. The first pressure sensor is disposed at the first side surface and the second pressure sensor is disposed at the second side surface.

9 Claims, 9 Drawing Sheets

(56)  References Cited

U.S. PATENT DOCUMENTS

| 9,494,053 | B2 | 11/2016 | Orosa | |
|---|---|---|---|---|
| 10,718,221 | B2 * | 7/2020 | Rice | F01D 17/148 |
| 2006/0045728 | A1 * | 3/2006 | Martin | F04D 29/563 |
| | | | | 415/1 |
| 2013/0103323 | A1 * | 4/2013 | Snider | F01D 21/003 |
| | | | | 702/182 |
| 2014/0314542 | A1 | 10/2014 | Hovhannisian | |
| 2017/0218841 | A1 * | 8/2017 | Nestico | F01D 17/14 |
| 2017/0284296 | A1 * | 10/2017 | Nestico | F02C 7/057 |

* cited by examiner

SYSTEMS AND METHODS FOR CONTROLLING STRUT POSITIONS FOR AN AIRCRAFT PROPULSION SYSTEM STRUT ASSEMBLY

TECHNICAL FIELD

This disclosure relates generally to aircraft propulsion system strut assemblies and, more particularly, to systems and methods for controlling strut positions for strut assemblies.

BACKGROUND OF THE ART

Some propulsion systems for aircraft may include strut assemblies for various fluid flow paths. These strut assemblies may provide structural support for static structures of the propulsion systems. Various strut assemblies are known in the art. While these known assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a strut assembly for an aircraft propulsion system includes an outer case, an inner case, a plurality of struts, and a plurality of pressure sensors. The outer case and the inner case form a fluid flow path through the strut assembly. The plurality of struts is disposed in the fluid flow path. Each strut extends between and to the outer case and the inner case. A first strut of the plurality of struts includes a leading strut portion and a trailing strut portion. The leading strut portion is rotatable relative to the trailing strut portion about a first rotational axis. The leading strut portion extends between a first axial end and a second axial end. The first axial end forms a leading edge of the first strut. The leading strut portion includes a first side surface and a second side surface. The first side surface and the second side surface extending from the first axial end to the second axial end. The plurality of pressure sensors includes a first pressure sensor and a second pressure sensor. The first pressure sensor is disposed at the first side surface and the second pressure sensor is disposed at the second side surface.

In any of the aspects or embodiments described above and herein, the trailing strut portion may be fixed relative to the outer case and the inner case.

In any of the aspects or embodiments described above and herein, the trailing strut portion may be rotatable about a second rotational axis.

In any of the aspects or embodiments described above and herein, the second axial end may be disposed at the trailing strut portion.

In any of the aspects or embodiments described above and herein, the first side surface and the second side surface are symmetrical.

In any of the aspects or embodiments described above and herein, the strut assembly may further includes a controller. The controller may be in signal communication with the plurality of sensors. The controller may be configured to control a rotational position of the leading strut portion.

In any of the aspects or embodiments described above and herein, the controller may include a processor in communication with a non-transitory memory storing instructions, which instructions when executed by the processor, may cause the processor to control the rotational position of the leading strut portion to extend in a direction of a fluid flow along the fluid flow path.

In any of the aspects or embodiments described above and herein, the instructions, when executed by the processor, may further cause the processor to control the rotational position based on a first pressure output signal from the first pressure sensor and a second pressure output signal from the second pressure sensor.

In any of the aspects or embodiments described above and herein, the instructions, when executed by the processor, may further cause the processor to control the rotational position based on identification of a magnitude of the difference between the first pressure output signal and the second pressure output signal, where the difference is less than a threshold value.

In any of the aspects or embodiments described above and herein, the controller may be further configured to control a rotational position of the trailing strut portion independent of the rotational position of the leading strut portion.

According to another aspect of the present disclosure, a method for controlling strut positions for a strut assembly for an aircraft propulsion system is provided. The method includes directing a fluid through a strut assembly along a fluid flow path, determining a fluid flow direction of the fluid along the fluid flow path, and controlling strut positions of a plurality of struts of the strut assembly by rotating a leading strut portion of each strut relative to a trailing strut portion of each strut and positioning the leading strut portion of each strut to extend in the fluid flow direction.

In any of the aspects or embodiments described above and herein, determining the fluid flow direction may include determining the fluid flow direction based on an operating state for the aircraft propulsion system.

In any of the aspects or embodiments described above and herein, determining the fluid flow direction may include determining the fluid flow direction based on a differential pressure of the fluid for at least one strut of the plurality of struts.

In any of the aspects or embodiments described above and herein, controlling strut positions of the plurality of struts of the strut assembly may further include rotating the trailing strut portion.

In any of the aspects or embodiments described above and herein, controlling strut positions of the plurality of struts of the strut assembly may further include rotating the trailing strut portion to induce a swirl direction for the fluid.

According to another aspect of the present disclosure, a propulsion system for an aircraft includes a gas turbine engine and an air intake. The gas turbine engine includes a compressor. The compressor forms a core flow path. The air intake includes an intake inlet, a core outlet, and a strut assembly. The air intake is configured to receive ambient air at the intake inlet and direct the ambient air to the core outlet. The core outlet is disposed at the compressor. The strut assembly is disposed at the core outlet. The strut assembly includes a plurality of struts. Each strut includes a leading strut portion and a trailing strut portion. The leading strut portion is rotatable relative to the trailing strut portion about a rotational axis. The leading strut portion extends between a first axial end and a second axial end. The first axial end forms a leading edge of the first strut. The second axial end is disposed at the trailing strut portion.

In any of the aspects or embodiments described above and herein, the air intake may include an annular portion disposed at the core outlet. The plurality of struts may be disposed within the annular portion.

In any of the aspects or embodiments described above and herein, the rotational axis may be disposed at the second axial end.

In any of the aspects or embodiments described above and herein, the trailing strut portion may be fixed relative to the leading strut portion.

In any of the aspects or embodiments described above and herein, the trailing strut portion may be rotatable about a second rotational axis.

The present disclosure, and all its aspects, embodiments and advantages associated therewith will become more readily apparent in view of the detailed description provided below, including the accompanying drawings.

DETAILED DESCRIPTION

Figure 1:
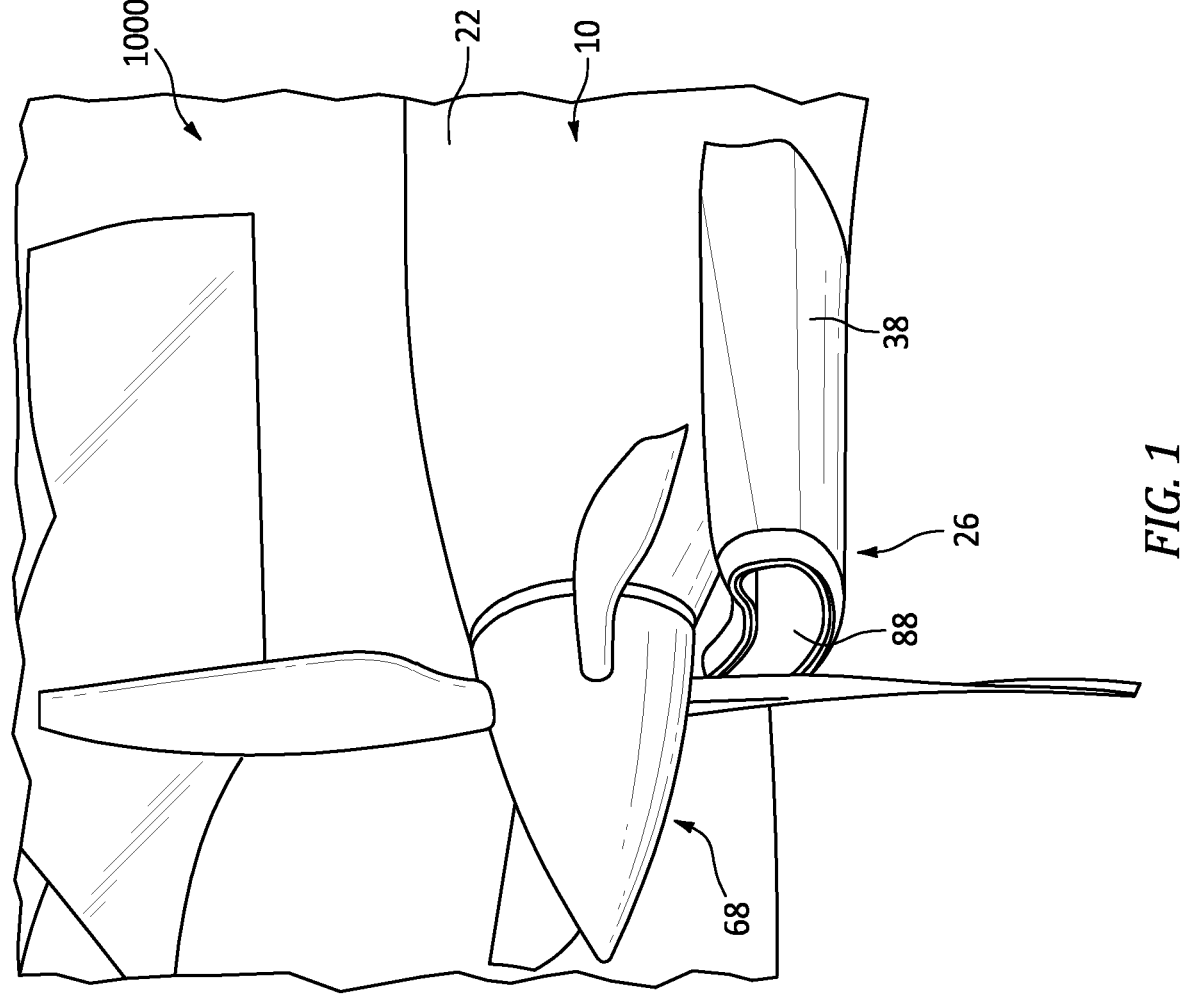
FIG. 1 illustrates a perspective view of a propulsion system for an aircraft, in accordance with one or more embodiments of the present disclosure.
Figure 2:
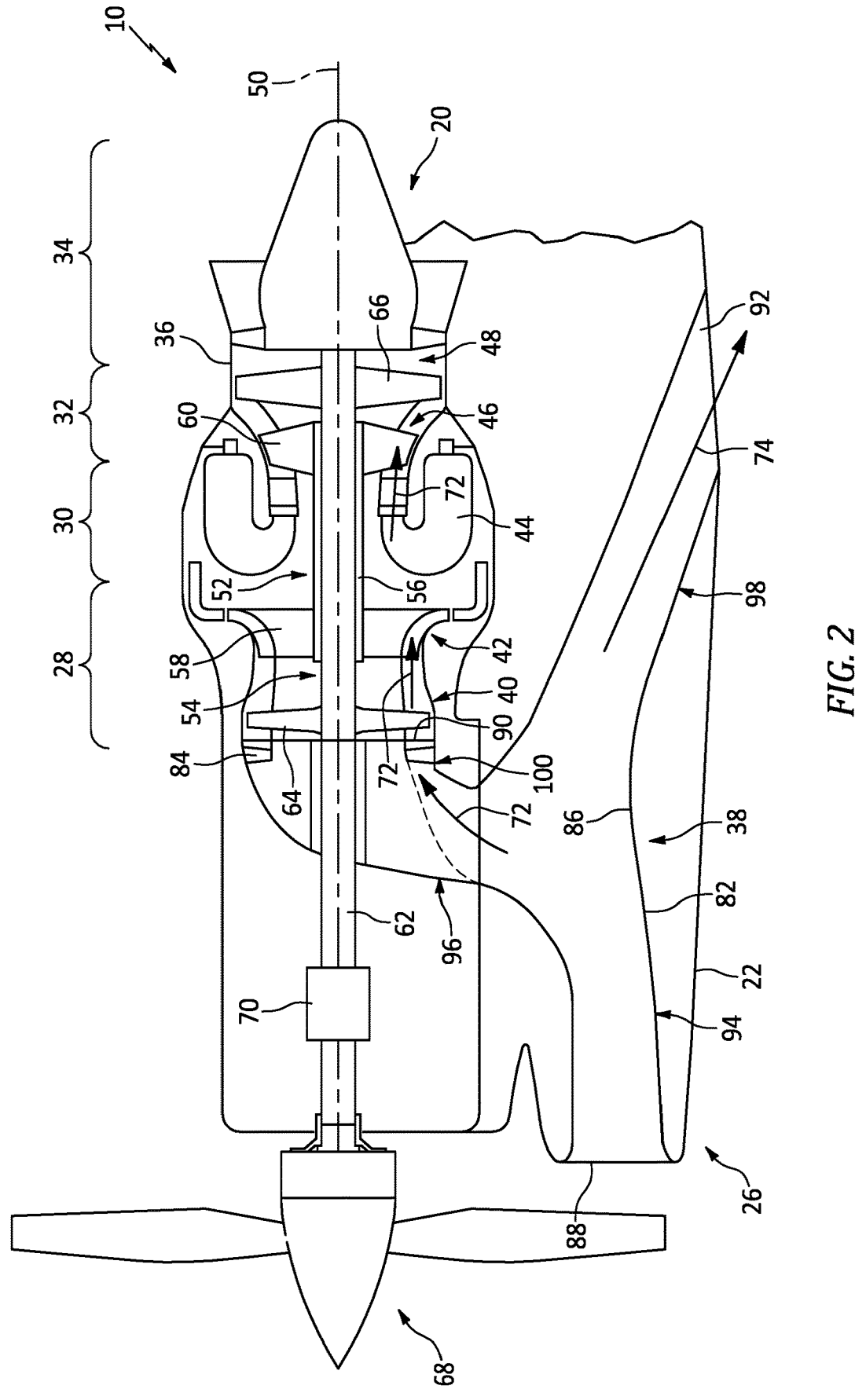
FIG. 2 illustrates a schematic view of the propulsion system of FIG. 1, in accordance with one or more embodiments of the present disclosure.

FIGS. 1 and 2 illustrate a propulsion system 10 for an aircraft 1000. The aircraft propulsion system 10 includes a gas turbine engine 20 and a nacelle 22 (e.g., an aircraft propulsion system housing). The propulsion system 10 (e.g., the nacelle 22) may be mounted to or otherwise formed by a portion of the aircraft 1000 such as, but not limited to, a wing or fuselage of the aircraft 1000.

The gas turbine engine 20 of FIGS. 1 and 2 is configured as a turboprop engine. However, the present disclosure is not limited to any particular configuration of gas turbine engine for the propulsion system 10, and examples of gas turbine engine configurations for the propulsion system 10 may include, but are not limited to, a turbofan engine, a turbojet engine, a propfan engine, or the like. The gas turbine engine 20 of FIGS. 1 and 2, for example, includes an air inlet section 26, a compressor section 28, a combustor section 30, a turbine section 32, an exhaust section 34, and an engine static structure 36. The air inlet section includes an air intake

4

38. The compressor section 28 may include a low-pressure compressor (LPC) 40 and a high-pressure compressor (HPC) 42. The combustor section 28 includes an annular combustor 44. The turbine section 32 may include and a high-pressure turbine (HPT) 46 a low-pressure turbine (LPT) 48.

The gas turbine engine 20 sections 28, 30, and 32 of FIG. 2 are arranged sequentially along an axial centerline 50 (e.g., a rotational axis) of the propulsion system 10. The engine static structure 36 may include, for example, one or more engine cases for the gas turbine engine 20. The engine static structure 36 may additionally include cowlings, bearing assemblies, or other structural components of the gas turbine engine 20. The one or more engine cases house and/or structurally support one or more of the engine sections 26, 28, 30, 32, and 34. The engine sections 28, 30, 32 may be collectively referred to as an "engine core" of the gas turbine engine 20.

The gas turbine engine 20 of FIG. 2 further includes a first rotational assembly 52 (e.g., a high-pressure spool) and a second rotational assembly 54 (e.g., a low-pressure spool). The first rotational assembly 52 and the second rotational assembly 54 are mounted for rotation about the axial centerline 50 relative to the engine static structure 36.

The first rotational assembly 52 includes a first shaft 56, a bladed first compressor rotor 58 for the high-pressure compressor 42, and a bladed first turbine rotor 60 for the high-pressure turbine 46. The first shaft 56 interconnects the bladed first compressor rotor 58 and the bladed first turbine rotor 60. The second rotational assembly 54 includes a second shaft 62, a bladed second compressor rotor 64 for the low-pressure compressor 40, a bladed second turbine rotor 66 for the low-pressure turbine 48, and a propeller 68. The second shaft 62 interconnects the bladed second compressor rotor 64 and the bladed second turbine rotor 66. The second shaft 62 may be connected to the propeller 68 by one or more speed-reducing gear assemblies 70 to drive the propeller 68 at a reduced rotational speed relative to the second shaft 62. Alternatively, the second shaft 62 may directly interconnect the propeller 68 with the bladed second compressor rotor 64 and the bladed second turbine rotor 66. The combustor 44 of FIG. 2 is disposed between the bladed first compressor rotor 58 and the bladed first turbine rotor 60 along the axial centerline 50.

The nacelle 22 houses the gas turbine engine 20 and forms and aerodynamic cover for the propulsion system 10. The nacelle 22 may extend circumferentially about (e.g., completely around) the axial centerline 50. The nacelle 22 may surround and/or support portions of the air intake 38.

During operation of the propulsion system 10 of FIGS. 1 and 2, ambient air enters the propulsion system 10 through the air intake 38 and is directed into a core flow path 72 and a bypass flow path 74. The core flow path 72 extends generally axially along the axial centerline 50 within the gas turbine engine 20. More particularly, the core flow path 72 extends axially through the gas turbine engine 20 sections 26, 28, 30, 32, and 34 of FIG. 2. The air within the core flow path 72 may be referred to as "core air." The core air is compressed by the bladed second compressor rotor 64 and the bladed first compressor rotor 58 and directed into a combustion chamber of the combustor 44. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 60 and the bladed second turbine rotor 66 to rotate. The rotation of the bladed first turbine rotor 60 and the bladed second turbine rotor 66 respectively drive rotation of the first rotational assembly 52 and the second rotational assembly 54. Rotation of the second rotational assembly 54 further drives rotation of the propeller 68 to provide propulsion (e.g., thrust) for the aircraft 1000.

Figure 3:
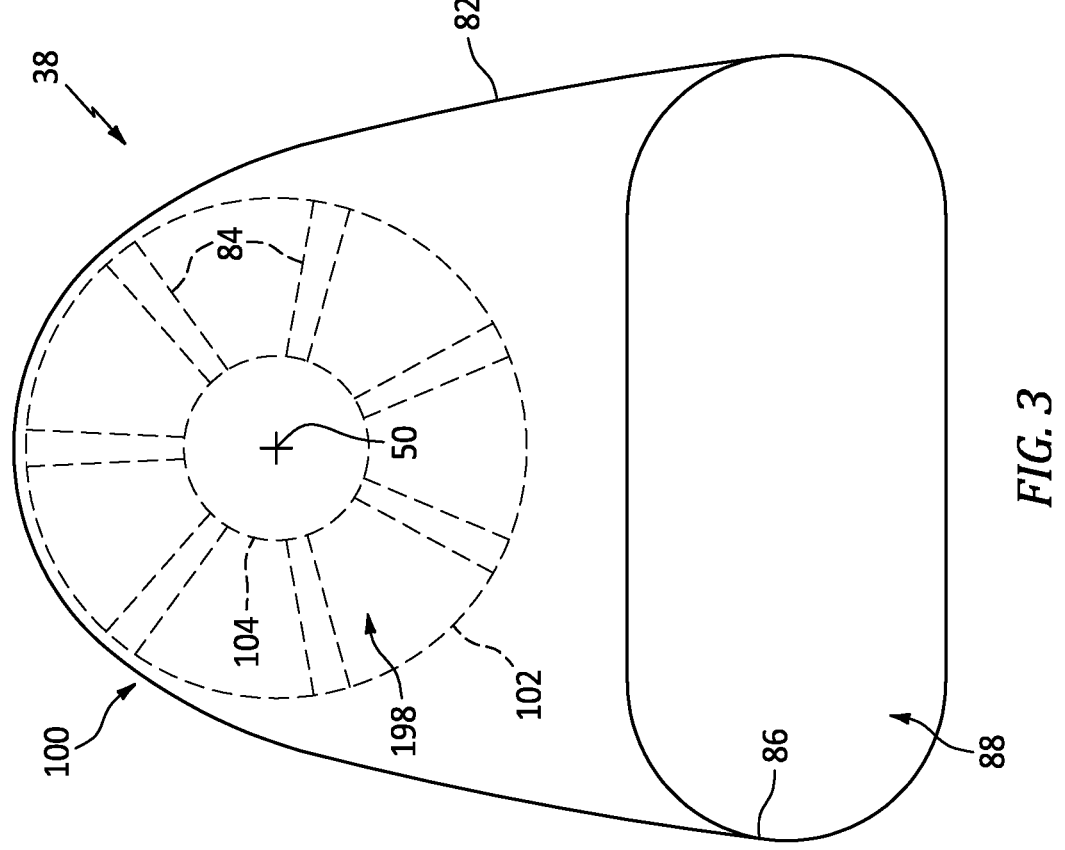
FIG. 3 illustrates a front view of an air intake for an aircraft propulsion system, in accordance with one or more embodiments of the present disclosure.

Referring to FIGS. 1-3, the air intake 38 of FIGS. 1-3 includes an intake body 82 and a plurality of struts 84. The intake body 82 includes an interior surface 86 and intake inlet 88, a core outlet 90, and a bypass outlet 92. The intake inlet 88 forms an opening at (e.g., on, adjacent, or proximate) an upstream end of the air intake 38. The intake inlet 88 of FIGS. 1-3 is radially offset from the axial centerline 50. For example, the intake inlet 88 (e.g., the entire intake inlet 88) may be radially offset from the axial centerline 50 in a radial direction (e.g., downwardly), as shown in FIGS. 1 and 2. The intake inlet 88 may also be configured with an axial facing orientation. For example, the intake inlet 88 of FIGS. 1 and 2 faces in an axially-forward direction. The core outlet 90 forms an opening at (e.g., on, adjacent, or proximate) a downstream end of the air intake 38. The core outlet 90 is disposed at (e.g., on, adjacent, or proximate) the compressor section 28 to direct ambient air entering the air intake 38 into the compressor section 28. For example, the core outlet 90 of FIG. 2 is disposed at (e.g., on, adjacent, or proximate) and in fluid communication with an inlet of the low-pressure compressor 40. The bypass outlet 92 forms an opening at (e.g., on, adjacent, or proximate) a downstream end of the air intake 38. For example, the bypass outlet 92 may be disposed at (e.g., on, adjacent, or proximate) or otherwise formed through an exterior surface of the nacelle 22 to direct air from the air intake 38 to an exterior of the propulsion system 10. The present disclosure, however, is not limited to the particular configuration and orientation of the intake inlet 88, the core outlet 90, or the bypass outlet 92.

The intake body 82 forms a series of air passages through the air intake 38. For example, intake body 82 forms an air inlet duct 94, a core flow duct 96, and a bypass flow duct 98. Each of the air inlet duct 94, the core flow duct 96, and the bypass flow duct 98 include portions of the interior surface 86. For clarity, the air intake 38 of FIG. 2 may be understood to have an exaggerated size relative to other components of the propulsion system 10. The present disclosure, however, is not limited to any particular size of the air intake 38.

The air inlet duct 94 includes the intake inlet 88. The air inlet duct 94 extends from the intake inlet 88 to the core flow duct 96 and the bypass flow duct 98. The air inlet duct 94 may be disposed outside of the gas turbine engine 20 and may be formed by, disposed within, or otherwise in contact with the nacelle 22.

The core flow duct 96 includes the core outlet 90. The core flow duct 96 extends from the air inlet duct 94 to the core outlet 90. The core flow duct 96 of FIG. 2 extends in a radially inward direction from the air inlet duct 94 to the core outlet 90. The core outlet 90 and portions of the core flow duct 96 may be configured to form an annular portion 100 of the core flow duct 96 extending circumferentially about (e.g., completely around) the axial centerline 50. The annular portion 100 of the core flow duct 96 may including an outer radial surface 102 and an inner radial surface 104. The annular portion 100 may form an annular core flow path 198 between the outer radial surface 102 and the inner radial surface 104 at (e.g., on, adjacent, or proximate) the core outlet 90.

The bypass flow duct 98 includes the bypass outlet 92. The bypass flow duct 98 extends from the air inlet duct 94 to the bypass outlet 92. The bypass flow duct 98 of FIG. 2 extends in an axially aft and a radially outward direction from the air inlet duct 94 to the bypass outlet 92. The bypass flow duct 98 may be disposed outside of the gas turbine engine 20 and may be formed by, disposed within, or otherwise in contact with the nacelle 22.

The plurality of struts 84 of FIG. 3 are disposed in the annular portion 100 to provide structural support for the air intake 38 and to direct air flow into the compressor section 28. Each strut 84 extends between and to the outer radial surface 102 and the inner radial surface 104. The struts 84 of FIG. 3 are circumferentially distributed about the annular portion 100 (e.g., about the axial centerline 50) as a circumferentially array of struts.

Figure 4:
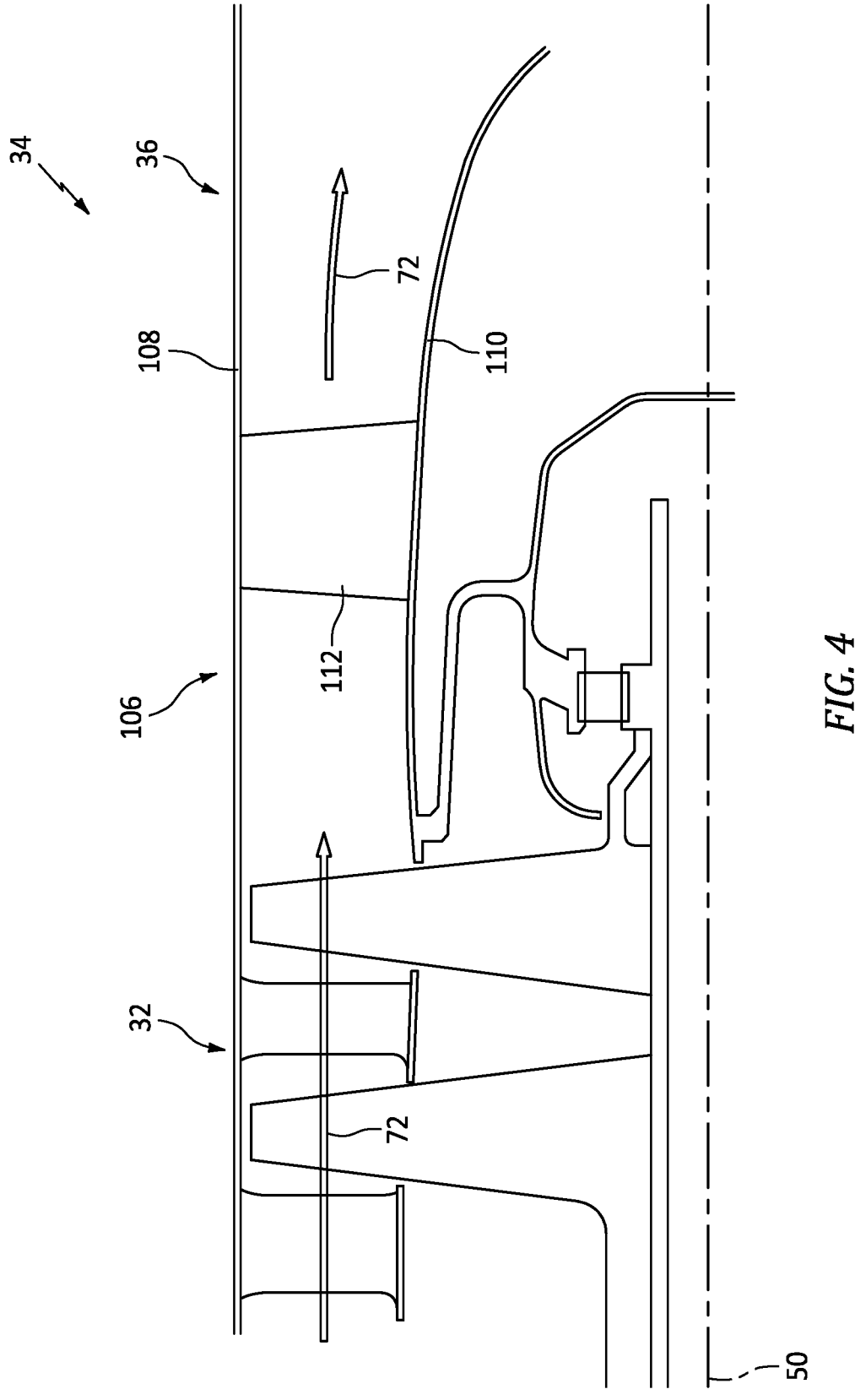
FIG. 4 illustrates a side, cutaway view of a portion of an exhaust section for an aircraft propulsion system, in accordance with one or more embodiments of the present disclosure.

Referring to FIG. 4, the exhaust section 34 (see FIG. 2) includes an exhaust case assembly 106. The exhaust case assembly 106 of FIG. 4 includes an outer exhaust case 108, and inner exhaust case 110, and a plurality of struts 112. Combustion exhaust gas flowing along the core flow path 72 from the turbine section 32 passes through the exhaust section 34 between (e.g., radially between) the outer exhaust case 108 and the inner exhaust case 110 (see FIG. 2). The outer exhaust case 108 and the inner exhaust case 110 form portions (e.g., annular portions) of the engine static structure 36.

The plurality of struts 112 of FIG. 4 are disposed in the exhaust case assembly 106 to provide structural support for the exhaust case assembly 106 and to direct combustion exhaust gas flow through the exhaust section 34 (see FIG. 2). Each strut 112 extends between and to the outer exhaust case 108 and the inner exhaust case 110. The struts 112 of FIG. 4 are circumferentially distributed about the exhaust case assembly 106 (e.g., about the axial centerline 50) as a circumferentially array of struts.

Figure 5:
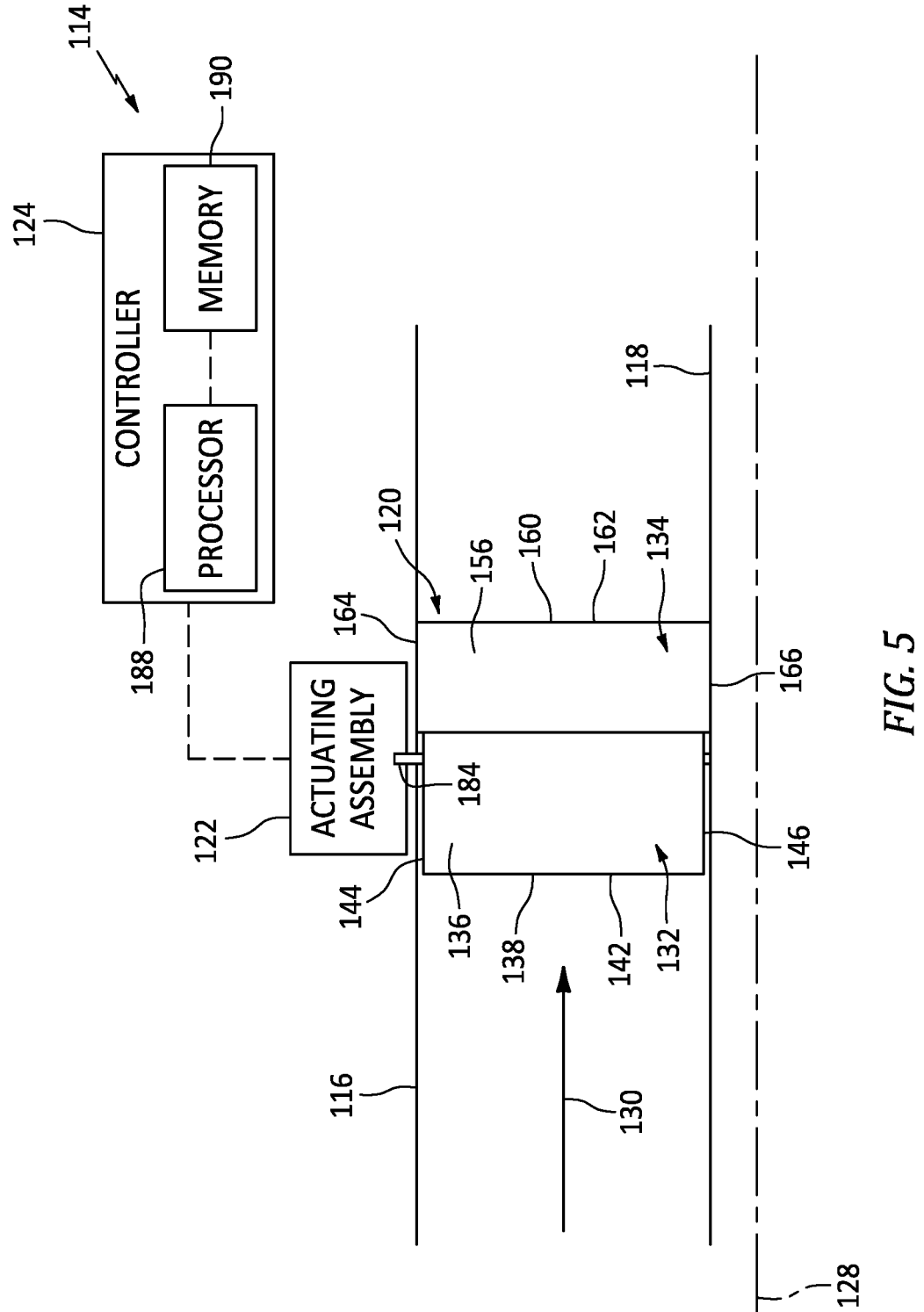
FIG. 5 illustrates a side, schematic view of a portion of a strut assembly, in accordance with one or more embodiments of the present disclosure.
Figure 6:
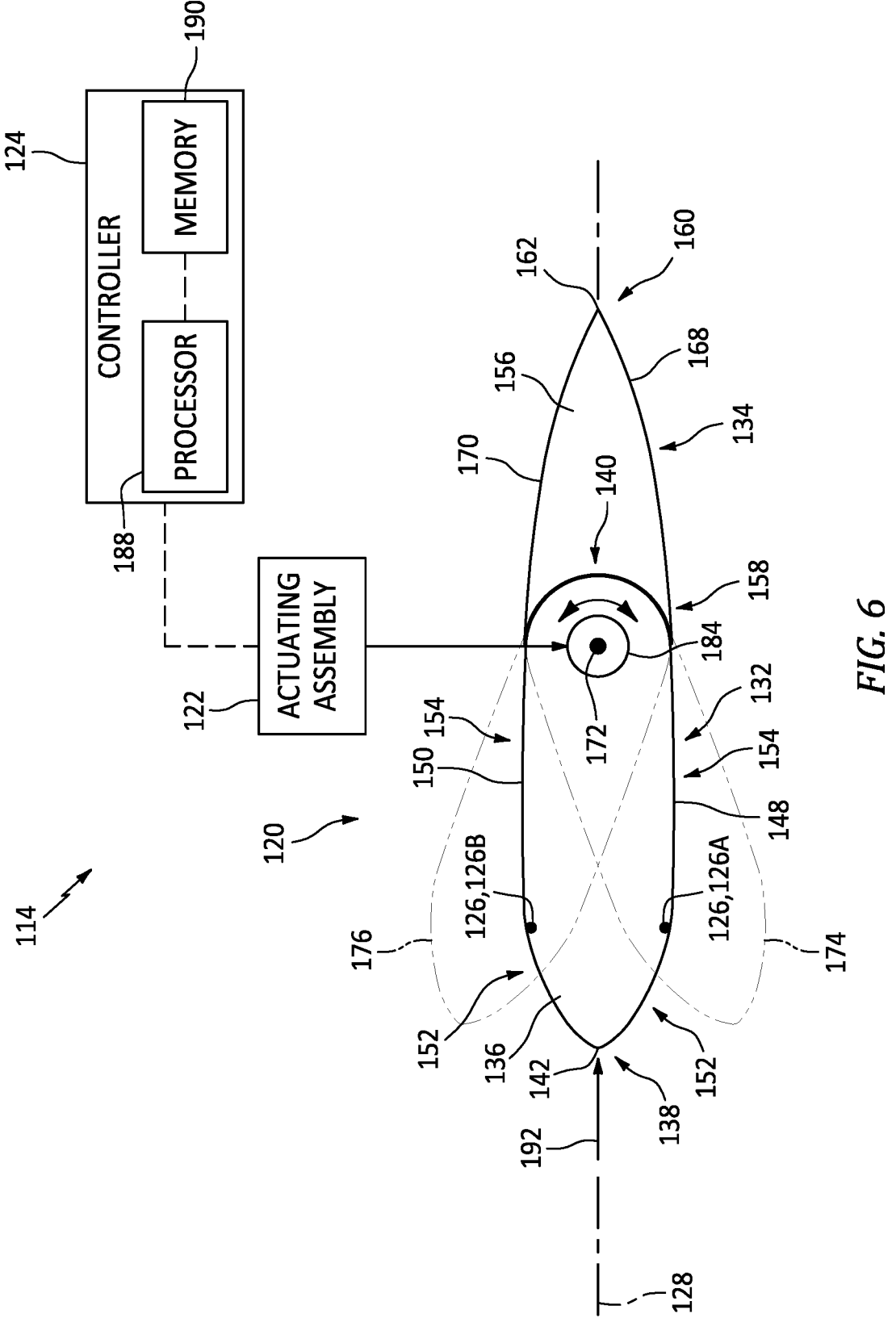
FIG. 6 illustrates a top, schematic view of a portion of a strut assembly, in accordance with one or more embodiments of the present disclosure.
Figure 7:
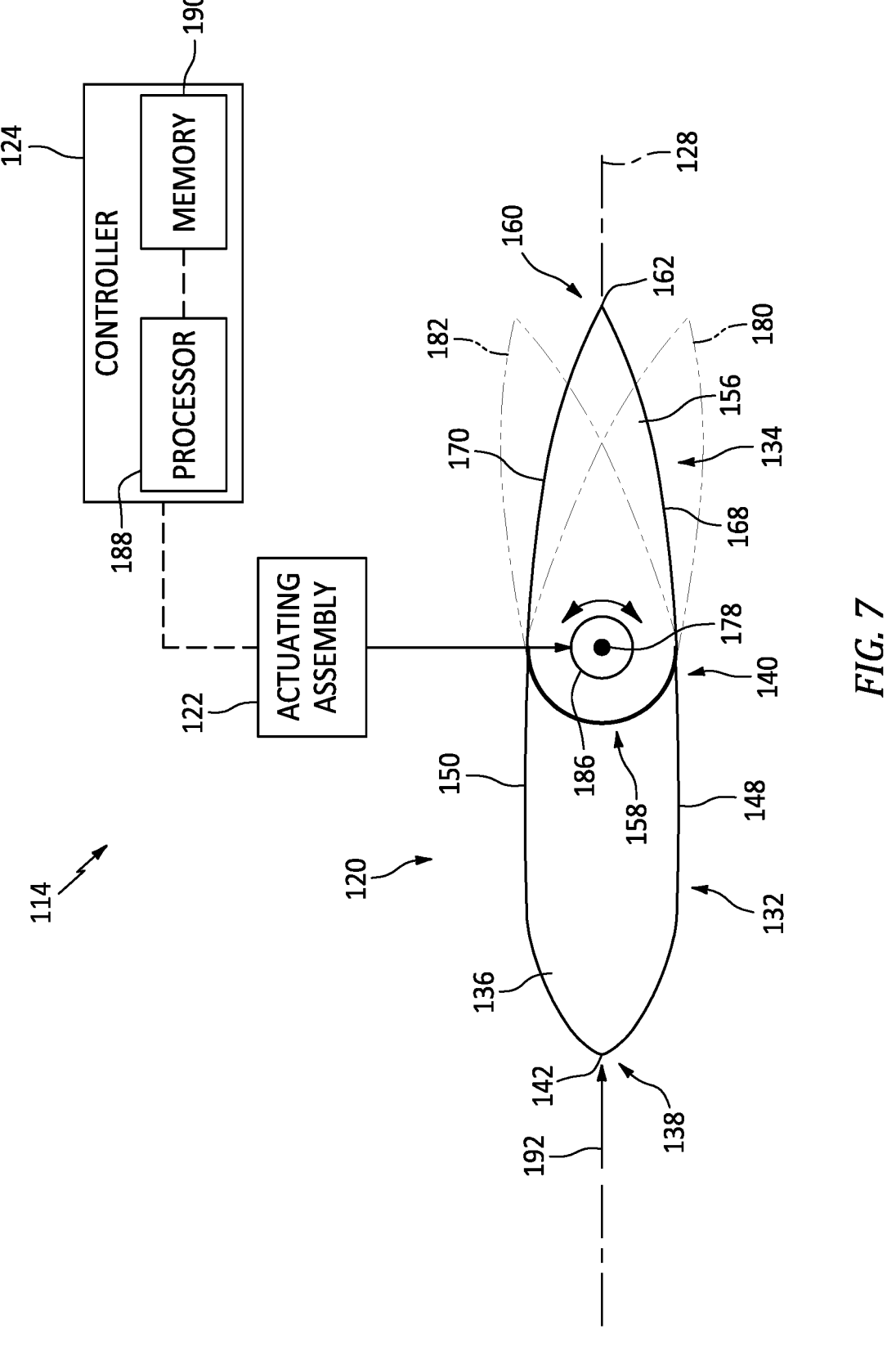
FIG. 7 illustrates another top, schematic view of a portion of a strut assembly, in accordance with one or more embodiments of the present disclosure.

Referring to FIGS. 5-7, the present disclosure includes a strut assembly 114. Aspects of the strut assembly 114 may be used, for example, for the plurality of struts 84 of the air intake 38, the plurality of struts 112 for the exhaust case assembly 106, and/or other implementations of struts or moveable fluid control surfaces for fluid flow paths (e.g., annular fluid flow paths). The strut assembly 114 of FIGS. 5-7 includes an outer case 116, an inner case 118, a plurality of struts 120, and an actuating assembly 122. The strut assembly 114 may additionally include a controller 124 and/or pressure sensors 126.

The outer case 116 and the inner case 118 each extend circumferentially about (e.g., completely around) an axial centerline 128 of the strut assembly 114. The outer case 116 circumscribes the inner case 118. The outer case 116 is spaced (e.g., radially spaced) from the inner case 118 to form a fluid (e.g., air) flow path 130 between the outer case 116 and the inner case 118. The fluid flow path 130 formed by the outer case 116 and the inner case 118 may be an annular fluid flow path. Each of the outer case 116 and the inner case 118 may be a discrete case or may be formed by portions of another case or structural component (e.g., a case or structural component of the engine static structure 36, see FIG. 2).

The plurality of struts 120 are circumferentially distributed about the strut assembly 114 (e.g., about the axial centerline 128) as a circumferentially array of struts. Each of the struts 120 extends between and to the outer case 116 and the inner case 118. FIG. 5 illustrates a side schematic view of the strut assembly 114 including one strut 120 of the plurality of struts 120. FIGS. 6 and 7 illustrate cutaway top views of embodiments of the strut assembly 114 including one strut 120 of the plurality of struts 120. Each strut 120 of the plurality of struts 120 may include a leading strut portion 132 and a trailing strut portion 134, as shown in FIGS. 5-7.

The leading strut portion 132 includes a leading strut body 136. The leading strut body 136 extends between and to a first axial end 138 of the leading strut portion 132 and a second axial end 140 of the leading strut portion 132. The first axial end 138 may form a leading edge 142 for the strut 120. The second axial end 140 is disposed downstream of the first axial end 138 relative to the fluid flow path 130. The second axial end 140 is disposed at (e.g., on, adjacent, or proximate) the trailing strut portion 134. The leading strut body 136 extends between and to a first radial end 144 of the leading strut portion 132 and a second radial end 146 of the leading strut portion 132. The first radial end 144 is disposed at (e.g., on, adjacent, or proximate) the outer case 116. The second radial end 146 is disposed at (e.g., on, adjacent, or proximate) the inner case 118. The leading strut body 136 includes a first side surface 148 and a second side surface 150 disposed opposite the first side surface 148. Each of the first side surface 148 and the second side surface 150 extend between and to the first axial end 138 and the second axial end 140. Each of the first side surface 148 and the second side surface 150 extend between and to the first radial end 144 and the second radial end 146. The first side surface 148 and the second side surface 150 may be symmetrical or substantially symmetrical to one another (e.g., relative to an axial plane of the leading strut body 136 extending from the first axial end 138 to the second axial end 140). However, the first side surface 148 and the second side surface 150 are not limited to any particular shapes or symmetry.

Each of the first side surface 148 and the second side surface 150 may include a first surface portion 152 and a second surface portion 154. The first surface portion 152 may extend (e.g., axially extend) from the first axial end 138 to the second surface portion 154. The first surface portion 152 may have a curved (e.g., convex) shape extending from the first axial end 138 toward the second surface portion 154. The second surface portion 154 may extend (e.g., axially extend) from the first surface portion 152 to the second axial end 140. The second surface portion 154 may have a straight or substantially straight orientation.

The trailing strut portion 134 includes a trailing strut body 156. The trailing strut body 156 extends between and to a first axial end 158 of the trailing strut portion 134 and a second axial end 160 of the trailing strut portion 134. The first axial end 158 is disposed at (e.g., on, adjacent, or proximate) the leading strut portion 132. The second axial end 160 is disposed downstream of the first axial end 158 relative to the fluid flow path 130. The second axial end 160 may form a trailing edge 162 for the strut 120. The trailing strut body 156 extends between and to a first radial end 164 of the trailing strut portion 134 and a second radial end 166 of the trailing strut portion 134. The first radial end 164 is disposed at (e.g., on, adjacent, or proximate) the outer case 116. The second radial end 166 is disposed at (e.g., on, adjacent, or proximate) the inner case 118. The trailing strut body 156 includes a first side surface 168 and a second side surface 170 disposed opposite the first side surface 168. Each of the first side surface 168 and the second side surface 170 extend between and to the first axial end 158 and the second axial end 160. Each of the first side surface 168 and the second side surface 170 extend between and to the first radial end 164 and the second radial end 166. The first side surface 168 and the second side surface 170 have a curved (e.g., convex) shape extending from the second axial end 160 toward the first axial end 158. The first side surface 168 and the second side surface 170 may be symmetrical or substantially symmetrical to one another (e.g., relative to an axial plane of the trailing strut body 156 extending from the first axial end 158 to the second axial end 160). However, the first side surface 168 and the second side surface 170 are not limited to any particular shapes or symmetry.

FIG. 6 illustrates an embodiment of the strut 120 in which the leading strut portion 132 is moveable and the trailing strut portion 134 is fixed (e.g., relative to the outer case 116 and the inner case 118). The leading strut portion 132 may, therefore, be moveable relative to the trailing strut portion 134. The leading strut body 136 may be movably and/or rotatably mounted to the outer case 116 and/or the inner case 118. The leading strut portion 132 of FIG. 6 is rotatable about an axis 172 (e.g., a rotational axis). The axis 172 may extend radially relative to the axial centerline 128. The axis 172 may be disposed at (e.g., on, adjacent, or proximate) the second axial end 140. The leading strut portion 132 of FIG. 6 is illustrated in an axially-extending position which may be understood as a "default" position of the leading strut portion 132 of FIG. 6. However, a default position of the leading strut portion 132 may refer to a position of the leading strut portion 132 in which the leading strut portion 132 extends (e.g., from the first axial end 138 to the second axial end 140) in a direction for which fluid is expected to flow through the strut assembly 114 under design conditions The design conditions may be based, for example, on an optimal fluid flow condition for an operating state of the propulsion system 10 (e.g., a cruising condition). Under these design conditions, the fluid flowing along the fluid flow path 130 may have a non-axial or swirl flow direction and, therefore, the leading strut portion 132 may have a default position which is also non-axial.

The leading strut portion 132 may be rotatable in clockwise and counter-clockwise rotational directions relative to the axis 172. FIG. 6 additionally illustrates a first exemplary rotational position 174 and a second exemplary rotational position 176 of the leading strut portion 132. The leading strut portion 132 of FIG. 6 includes an actuating shaft 184 mounted (e.g., fixedly mounted) to the leading strut body 136. The actuating shaft 184 extends along the axis 172. The actuating shaft 184 is mechanically coupled with the actuating assembly 122. The actuating shaft 184 is configured to transfer rotational motion of the actuating assembly 122 to the leading strut body 136 for rotation of the leading strut portion 132 about the axis 172. The trailing strut portion 134 of FIG. 6 is fixed relative to the axis 172. For example, the trailing strut body 156 may be fixedly mounted to or otherwise formed by the outer case 116 and/or the inner case 118.

FIG. 7 illustrates another embodiment of the strut 120 in which the trailing strut portion 134 is moveable and the leading strut portion 132 is fixed (e.g., relative to the outer case 116 and the inner case 118). The trailing strut portion 134 may, therefore, be moveable relative to the leading strut portion 132. The trailing strut body 156 may be movably and/or rotatably mounted to the outer case 116 and/or the inner case 118. The trailing strut portion 134 of FIG. 7 is rotatable about an axis 178 (e.g., a rotational axis). The axis 178 may extend radially relative to the axial centerline 128. The axis 178 may be disposed at (e.g., on, adjacent, or proximate) the first axial end 158. The trailing strut portion 134 of FIG. 7 is illustrated in an axially-extending position which may be understood as a "default" position of the trailing strut portion 134. However, similar to that discussed above with respect to the leading edge portion 132, a default position of the trailing strut portion 134 may refer to a position of the trailing strut portion 134 in which the trailing strut portion 134 extends (e.g., from the first axial end 158 to the second axial end 160) in a direction for which fluid is expected to flow through the strut assembly 114 under design conditions The design conditions may be based, for example, on an optimal fluid flow condition for an operating state of the propulsion system 10 (e.g., a cruising condition). Under these design conditions, the fluid flowing along the fluid flow path 130 may have a non-axial or swirl flow direction and, therefore, the trailing strut portion 134 may have a default position which is also non-axial.

The trailing strut portion 134 may be rotatable in clockwise and counter-clockwise rotational directions relative to the axis 178. FIG. 7 additionally illustrates a first exemplary rotational position 180 and a second exemplary rotational position 182 of the trailing strut portion 134. The trailing strut portion 134 of FIG. 7 includes an actuating shaft 186 mounted (e.g., fixedly mounted) to the trailing strut body 156. The actuating shaft 186 extends along the axis 178. The actuating shaft 186 is mechanically coupled with the actuating assembly 122. The actuating shaft 184 is configured to transfer rotational motion of the actuating assembly 122 to the trailing strut body 156 for rotation of the trailing strut portion 134 about the axis 178. The leading strut portion 132 of FIG. 7 is fixed relative to the axis 178. For example, the leading strut body 136 may be fixedly mounted to or otherwise formed by the outer case 116 and/or the inner case 118.

While the movable leading strut portion 132 and the moveable trailing strut portion 134 are described above in separate embodiments, it should be understood that, in some embodiments of the strut assembly 114, both the leading strut portion 132 and the trailing strut portion 134 may be movable. For example, the leading strut portion 132 may be rotatable (e.g., independently rotatable) about the axis 172 and the trailing strut portion 134 may be rotatable about the axis 178, which axes 172, 178 may be separate rotational axes or a common rotational axis.

The actuating assembly 122 is configured to effect rotation of the leading strut portion 132 and/or the trailing strut portion 134. The actuating assembly 122 of the present disclosure is not limited to any particular configuration, provided the actuating assembly 122 is capable of effecting rotation of the leading strut portion 132 and/or the trailing strut portion 134 for each strut 120 of the plurality of struts 120. For example, the actuating assembly 122 may include one or more unison rings circumscribing the outer case 116 and mechanically coupled with the leading strut portion 132 and/or the trailing strut portion 134 (e.g., the actuating shaft 184 and/or the actuating shaft 186). The actuating assembly 122 may include one or more hydraulic actuators, pneumatic actuators, electro-mechanical actuators, or the like configured to effect rotation of the leading strut portion 132 and/or the trailing strut portion 134.

As an example, the actuating assembly 122 of FIG. 5 is disposed outside (e.g., radially outside) the outer case 116. The actuating assembly 122 of FIG. 5 is mechanically coupled to the actuating shaft 184 of the illustrated leading strut portion 132 of FIG. 5, which actuating shaft 184 extends through the outer case 116 from the leading strut body 136 to the actuating assembly 122.

In some embodiments, the strut assembly 114 may include the controller 124. The controller 124 may be in communication (e.g., wired and/or wireless signal communication) with the actuator 122. The controller 124 of FIGS. 5-7 includes a processor 188 and memory 190. The memory 190 is in signal communication with the processor 188. The processor 188 may include any type of computing device, computational circuit, or any type of process or processing circuit capable of executing a series of instructions that are stored in the memory 190, thereby causing the processor 188 to perform or control one or more steps or other processes. The processor 188 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 190 may represent one or more algorithms for controlling aspects of the propulsion system 10 and/or the strut assembly 114, and the stored instructions are not limited to any particular form (e.g., program files, system data, buffers, drivers, utilities, system programs, etc.) provided they can be executed by the processor 188. The memory 190 may be a non-transitory computer readable storage medium configured to store instructions that when executed by one or more processors, cause the one or more processors to perform or cause the performance of certain functions. The memory 190 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 124 may be achieved via the use of hardware, software, firmware, or any combination thereof. The controller 124 may also include input and output devices (e.g., keyboards, buttons, switches, touch screens, video monitors, sensor readouts, data ports, etc.) that enable the operator to input instructions, receive data, etc. The controller 124 may be located within the propulsion system 10 or may alternatively be located on an aircraft (e.g., the aircraft 1000) on which the propulsion system 10 is installed.

The controller 124 may form or otherwise be part of an electronic engine controller (EEC) for the propulsion system 10. The EEC may control operating parameters of the gas turbine engine 20 including, but not limited to, fuel flow, stator vane position (e.g., variable compressor inlet guide vane (IGV) position), compressor air bleed valve position, propeller 68 speed, propeller 68 blade pitch, etc. so as to control an engine power and/or thrust of the gas turbine engine 20 (see FIGS. 1 and 2). In some embodiments, the EEC may be part of a full authority digital engine control (FADEC) system for the propulsion system 10.

In some embodiments, the strut assembly 114 may include the pressure sensors 126. Each of the pressure sensors 126 is configured to measure a fluid pressure, for example, of a fluid within the fluid flow path 130. Each of the pressure sensors 126 may be configured as a transducer to generate pressure output signal representative of a measured fluid pressure. Each of the pressure sensors 126 may be in fluid communication with the controller 124 and configured to provide the generated pressure output signals to the controller 124.

The strut assembly 114 of FIG. 6 includes a first pressure sensor 126A and a second pressure sensor 126B. The first pressure sensor 126A and the second pressure sensor 126B of FIG. 6 are attached to or otherwise housed by the leading strut body 136. The first pressure sensor 126A is disposed at (e.g., on, adjacent, or proximate) the first side surface 148. For example, the first pressure sensor 126A may be disposed at (e.g., on, adjacent, or proximate) an interface between the first surface portion 152 and the second surface portion 154 of the first side surface 148. The second pressure sensor 126B is disposed at (e.g., on, adjacent, or proximate) the second side surface 150. For example, the second pressure sensor 126B may be disposed at (e.g., on, adjacent, or proximate) an interface between the first surface portion 152 and the second surface portion 154 of the second side surface 150.

Figure 8:
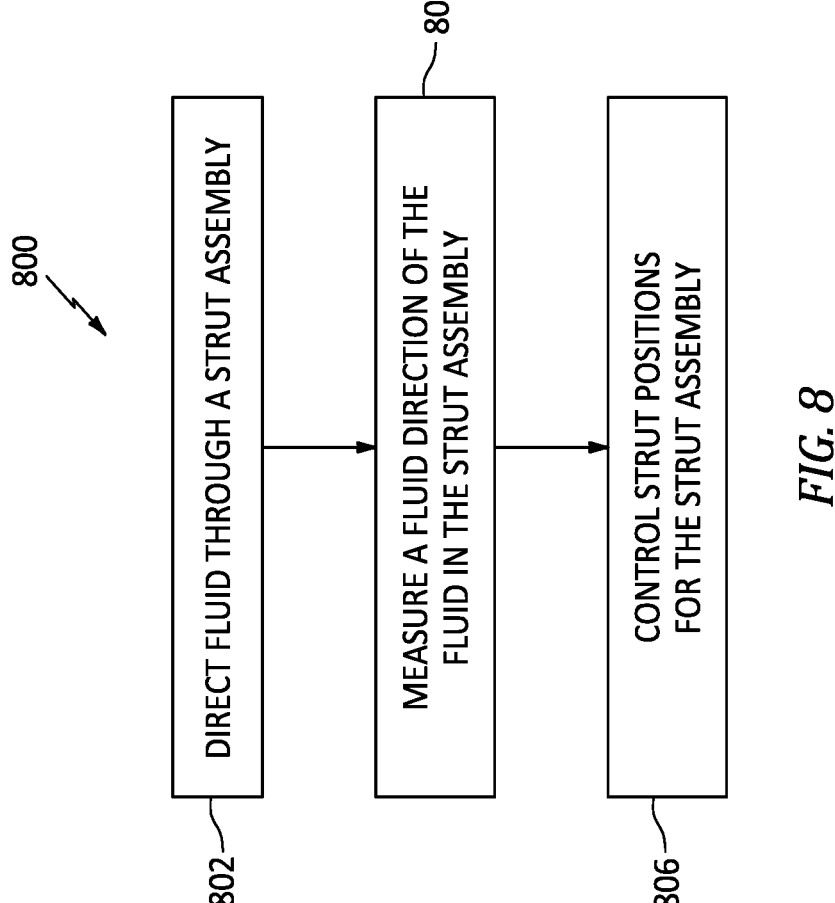
FIG. 8 illustrates a flow chart depicting a method for controller strut positions for a strut assembly, in accordance with one or more embodiments of the present disclosure.

Referring to FIGS. 5-8, a Method 800 for controlling strut positions for a strut assembly is provided. FIG. 8 illustrates a flowchart for the Method 800. The Method 800 may be performed for the strut assembly 114, as described herein. The Method 800 may be performed for the propulsion system 10 and its air intake 38 and/or exhaust case assembly 106. The controller 124 may be used to execute or control one or more steps of the Method 800. For example, the processor 188 may execute instructions stored in memory 190, thereby causing the controller 124 and/or its processor 188 to execute or otherwise control one or more steps of the Method 800. However, it should be understood that the Method 800 is not limited to use with the propulsion system 10, the air intake 38, the exhaust case assembly 106, the strut assembly 114, or the controller 124 described herein. Unless otherwise noted herein, it should be understood that the steps of Method 800 are not required to be performed in the specific sequence in which they are discussed below and, in some embodiments, the steps of Method 800 may be performed separately or simultaneously.

In Step 802, a fluid (e.g., air, combustion exhaust gas, etc.) is directed through the strut assembly 114 along the fluid flow path. The fluid interacts with and flows along the plurality of struts 120 as the fluid flows through the strut assembly 114. FIGS. 6 and 7 illustrate an exemplary fluid flow direction 192 of the fluid relative to one of the struts 120. The fluid flow direction 192 of FIGS. 6 and 7 is representative of a direct flow condition in which the strut 120, in its default position, extends in a direction (e.g., from the leading edge 142 to the trailing edge 162) which is the same as or substantially the same as the fluid flow direction 192. For example, the leading edge 142 of the struts 120 of FIGS. 6 and 7 directly faces the oncoming fluid in the fluid flow direction 192.

During various operational conditions of the propulsion system 10, the fluid flow direction 192 may change relative to position of the struts 120 (e.g., the positions of the leading strut portion 132 and/or the trailing strut portion 134). For example, propulsion system 10 operation and/or atmospheric conditions may cause changes in the fluid flow direction 192 relative to the strut 120 positions based on factors such as, but not limited to, altitude, wind speed, air speed, wind direction, propeller rotation speed, rotation direction, and/or blade pitch, engine power or operating state (e.g., cruise, takeoff, landing, idle, etc.) for the propulsion system 10, etc.

Figure 9:
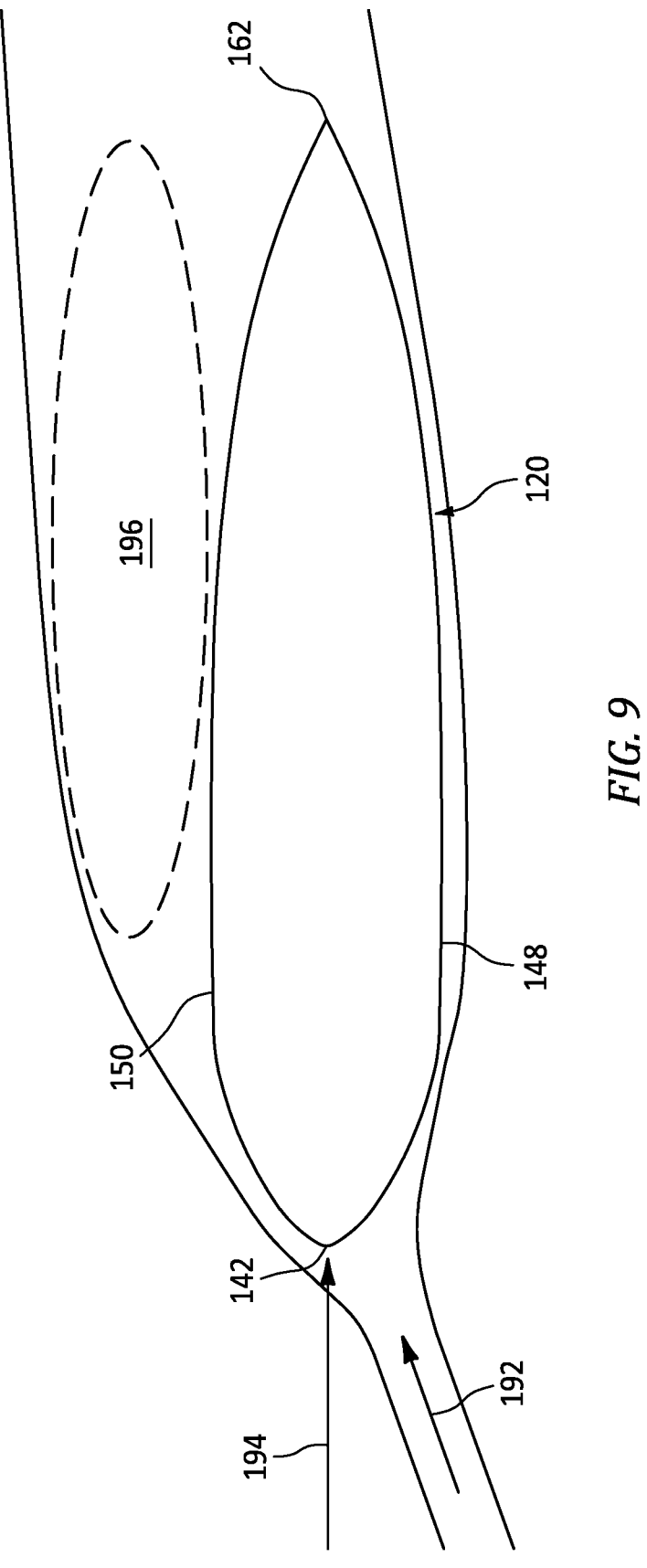
FIG. 9 illustrates a top view of a strut exposed to an indirect fluid flow condition, in accordance with one or more embodiments of the present disclosure.

For example, FIG. 9 illustrates the strut 120 experiencing an indirect flow condition. The exemplary fluid flow direction 192 of FIG. 9 is representative of an indirection flow condition in which the strut 120, in its default position, does not extend in a direction (e.g., from the leading edge 142 to the trailing edge 162) which is the same as or substantially the same as the fluid flow direction 192. In other words, the fluid flow direction 192 is directed toward the strut 120 of FIG. 9 at an angle relative to a direct flow direction (illustrated in FIG. 9 as direct flow direction 194). The leading edge 142 of the strut 120 of FIG. 9 does not directly face the oncoming fluid in the fluid flow direction 192.

Rather, the fluid flow direction 192 is directed toward the first side surface 148 of the strut 120 of FIG. 9. The indirection flow condition may cause flow separation of the fluid flowing along the fluid flow path 130 (see FIG. 5) in the vicinity of portions of the struts 120. For example, with the fluid flow direction 192 toward the first side surface 148 of the strut 120, as shown in FIG. 9, a flow separation region may develop along the opposing side surface (e.g., the second side surface 150) of the strut 120. FIG. 9 illustrates an exemplary flow separation region 196 along the second side surface 150. The flow separation of the fluid in the vicinity of the struts 120 may result in a reduction in fluid flow efficiency through the strut assembly 114 (e.g., reducing air intake 38 and/or exhaust section 34 efficiency, see FIG. 2).

In Step 804, the fluid flow direction 192 (e.g., relative to the struts 120) may be measured or otherwise determined. For example, the fluid flow direction may be measured using the pressure sensors 126. As described above, the pressure sensors 126 may include the first pressure sensor 126A and the second pressure sensor 126B, which pressure sensors 126A, 126B may be disposed at (e.g., on, adjacent, or proximate) opposing sides (e.g., the first side surface 148 and the second side surface 150) of each strut 120. The controller 124 may determine the fluid flow direction 192 relative to the struts 120 based on a differential fluid pressure between the first side surface 148 and the second side surface 150, as measured by the first pressure sensor 126A and the second pressure sensor 126B. For example, the controller 124 may determine the fluid flow direction 192 based on a magnitude of the difference between the pressure output signals from the first pressure sensor 126A and the second pressure sensor 126B. The present disclosure, however, is not limited to any particular system or method for measuring or otherwise determining the fluid flow direction 192. Different systems and/or sensors configured for directly measuring the fluid flow direction 192 may be contemplated. In some embodiments, the fluid flow direction 192 may be approximated or assumed based on known and/or identified operational conditions of the propulsion system 10. The fluid flow direction 192, for example, may be determined using one or more look-up tables stored in memory 190, which look-up tables may include experimentally or analytically determined fluid flow direction 192 values corresponding to one or more operational parameters for the propulsion system 10.

In Step 806, the strut positions for the strut assembly 114 may be controlled. For example, the controller 124 may control the actuating assembly 122 to change a position (e.g., a rotational position) of one or both of the leading strut portion 132 and/or the trailing strut portion 134. Positions of the leading strut portion 132 and/or the trailing strut portion 134 may be controlled, for example, based on the determined fluid flow direction 192 (see Step 804). Positions of the leading strut portion 132 and/or the trailing strut portion 134 may additionally or alternatively be controlled based on one or more other operational conditions or parameters of the propulsion system 10.

Step 806 may include controlling a position of the leading strut portion 132. The controller 124 may control the actuating assembly 122 to rotate the leading strut portion 132 about the axis 172 to position the leading strut portion 132 in an intended rotational position. The leading strut portion 132 may be positioned to extend in a direction (e.g., from the first axial end 138 to the second axial end 140) which is the same as or substantially the same as the fluid flow direction 192. Alignment of the leading strut portion 132 relative to the fluid flow direction 192 may be qualified based on the differential pressure measured by the pressure sensors 126. For example, the controller 124 may control the actuating assembly 122 to position the leading strut portion 132 so that a magnitude of the difference between the pressure output signals from the first pressure sensor 126A and the second pressure sensor 126B is less than a threshold value (e.g., a predetermined or dynamically determined threshold value). Alignment of the leading strut portion 132 relative to the fluid flow direction 192 may facilitate a reduction in flow separation of the fluid flow through the strut assembly 114. For example, alignment of the leading strut portion 132 of the struts 120 relative to the fluid flow direction 192 may facilitate reductions in pressure loss, as applied to an air intake, such as the air intake 38 (see FIGS. 2 and 3). Additionally or alternatively, for example, alignment of the leading strut portion 132 of the struts 120 relative to the fluid flow direction 192 may facilitate an improved exhaust discharge coefficient, as applied to a gas turbine engine exhaust section, such as the exhaust section 34 (see FIGS. 2 and 4).

Step 806 may include controlling a position of the trailing strut portion 134. The controller 124 may control the actuating assembly 122 to rotate the trailing strut portion 134 about the axis 178 to position the trailing strut portion 134 in an intended rotational position. The trailing strut portion 134 may be positioned to direct the fluid flowing along the fluid flow path 130 in an optimal flow direction for downstream components. The position of the trailing strut portion 134 may be controlled based on a schedule associated with an identified engine power or operating state (e.g., cruise, takeoff, landing, idle, etc.) for the propulsion system 10. For example, in air intake applications, the position of the trailing strut portion 138 may be determined based on a schedule to optimize surge margin and gas turbine engine 20 performance. For further example, in exhaust applications, the position of the trialing strut portion 138 may be determined based on a schedule to optimize exhaust ejector performance by changing the exhaust exit swirl angle during critical conditions. The trailing strut portion 134 for each strut 120 may be rotated to condition air flow in an air intake (e.g., the air intake 38) for a downstream compressor (e.g., the low-pressure compressor 40). The trailing strut portion 134 may be positioned in a generally axial direction or may be positioned to induce co-swirl (e.g., swirl in a direction of compressor rotation) or counter-swirl (e.g., swirl opposite the direction of compressor rotation) for the downstream compressor. By inducing co-swirl in the air flowing through the air intake 38 (e.g., the annular portion 100, see FIGS. 2 and 3), the struts 120 may facilitate improvements in compressor stall margin. In contrast, by inducing counter-swirl in the air flowing through the air intake 38 (e.g., the annular portion 100), the struts 120 may facilitate improvements in compressor pressure ratio.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A strut assembly for an aircraft propulsion system, the strut assembly comprising:

an outer case;

an inner case, the outer case and the inner case forming a fluid flow path through the strut assembly;

a plurality of struts disposed in the fluid flow path, each strut extending between and to the outer case and the inner case, a first strut of the plurality of struts including a leading strut portion and a trailing strut portion, the leading strut portion rotatable relative to the trailing strut portion about a first rotational axis, the leading strut portion extending between a first axial end and a second axial end, the first axial end forming a leading edge of the first strut, the leading strut portion including a first side surface and a second side surface, the first side surface and the second side surface extending from the first axial end to the second axial end;

a plurality of pressure sensors including a first pressure sensor and a second pressure sensor, the first pressure sensor disposed at the first side surface and the second pressure sensor disposed at the second side surface, each of the plurality of pressure sensors configured to measure a fluid pressure of a fluid within the fluid flow path; and a controller, the controller in signal communication with the plurality of sensors, the controller configured to control a rotational position of the leading strut portion based on measurements from the plurality of pressure sensors.

2. The strut assembly of claim 1, wherein the trailing strut portion is fixed relative to the outer case and the inner case.

3. The strut assembly of claim 1, wherein the trailing strut portion is rotatable about a second rotational axis.

4. The strut assembly of claim 1, wherein the second axial end is disposed at the trailing strut portion.

5. The strut assembly of claim 1, wherein the first side surface and the second side surface are symmetrical.

6. The strut assembly of claim 1, wherein the controller includes a processor in communication with a non-transitory memory storing instructions, which instructions when executed by the processor, cause the processor to control the rotational position of the leading strut portion to extend in a direction of a fluid flow along the fluid flow path.

7. The strut assembly of claim 6, wherein the instructions, when executed by the processor, further cause the processor to control the rotational position based on a first pressure output signal from the first pressure sensor and a second pressure output signal from the second pressure sensor.

8. The strut assembly of claim 7, wherein the instructions, when executed by the processor, further cause the processor to control the rotational position based on identification of a magnitude of the difference between the first pressure output signal and the second pressure output signal, where the difference is less than a threshold value.

9. The strut assembly of claim 1, wherein the controller is further configured to control a rotational position of the trailing strut portion independent of the rotational position of the leading strut portion.

* * * * *